United States Patent [19]
Giebel et al.

[11] Patent Number: 6,068,410
[45] Date of Patent: May 30, 2000

[54] SPLICE HOUSING ASSEMBLY AND ASSOCIATED ASSEMBLY METHOD FOR MECHANICALLY DECOUPLING A FERRULE FROM A SPLICE BODY

[75] Inventors: Markus A. Giebel; James P. Luther; Dennis M. Knecht; Thomas Theuerkorn, all of Hickory, N.C.

[73] Assignee: Siecor Corporation, Hickory, N.C.

[21] Appl. No.: 08/995,175

[22] Filed: Dec. 22, 1997

[51] Int. Cl.[7] ................................................. G02B 6/38
[52] U.S. Cl. .............................. 385/72; 385/60; 385/78; 385/98
[58] Field of Search .................. 385/95–98.6, 70–72.53, 385/78

[56] References Cited

U.S. PATENT DOCUMENTS

| | | | |
|---|---|---|---|
| 4,696,538 | 9/1987 | Despouys | 350/96.2 |
| 4,752,111 | 6/1988 | Fisher | 350/96.21 |
| 4,877,303 | 10/1989 | Caldwell et al. | 350/96.21 |
| 4,923,274 | 5/1990 | Dean | 350/96.21 |
| 4,964,688 | 10/1990 | Caldwell et al. | 350/96.2 |
| 5,040,867 | 8/1991 | Jong et al. | 385/60 |
| 5,101,463 | 3/1992 | Cubukciyan et al. | 385/72 |
| 5,241,613 | 8/1993 | Li et al. | 385/78 |
| 5,263,103 | 11/1993 | Kosinski | 385/31 |
| 5,367,594 | 11/1994 | Essert et al. | 385/70 |
| 5,394,496 | 2/1995 | Caldwell et al. | 385/70 |
| 5,428,703 | 6/1995 | Lee | 385/78 |
| 5,515,466 | 5/1996 | Lee | 385/78 |
| 5,748,819 | 5/1998 | Szentesi et al. | 385/60 |
| 5,818,992 | 10/1998 | Aloisio, Jr. et al. | 385/76 |

*Primary Examiner*—John D. Lee

[57] ABSTRACT

A splice housing assembly and an associated assembly method are provided in which the ferrule is mechanically decoupled from the splice body such that the ferrule has at least limited movement, typically in an off-axis direction, relative to the splice body. For example, the ferrule can be mechanically decoupled from the splice body by spacing the ferrule in a lengthwise direction from the splice body such that a medial portion of the first optical fiber extends between the ferrule and the splice body.

16 Claims, 2 Drawing Sheets

SPLICE HOUSING ASSEMBLY AND ASSOCIATED ASSEMBLY METHOD FOR MECHANICALLY DECOUPLING A FERRULE FROM A SPLICE BODY

FIELD OF THE INVENTION

The present invention relates generally to splice housing assemblies and associated assembly methods and, more particularly, to splice housing assemblies and associated assembly methods which mechanically decouple the ferrule from the splice body.

BACKGROUND OF THE INVENTION

It is desirable in many instances to splice optical fibers. For example, a relatively short length of optical fiber upon which a ferrule has been previously mounted may be spliced to a longer length of optical fiber in the field in order to facilitate connectorization of the resulting spliced optical fiber. Thus, the ferrule can be mounted upon a relatively short length of optical fiber, termed a pigtail, at the factory in order to simplify the connectorization of the resulting spliced optical fiber in the field.

In order to properly splice the optical fiber, as well as to protect the resulting splice, a number of splice housings and associated connectors have been developed. For example, U.S. Pat. No. 5,241,613 which issued Aug. 31, 1993 to Ming-Jun Li et al., and U.S. Pat. No. 5,040,867 which issued Aug. 20, 1991 to Michael de Jong et al. describe connectors which house a splice. As illustrated by these patents, conventional splice housings include a splice body that receives, through one end, the end portion of the pigtail opposite the end portion upon which the ferrule is mounted, and that receives, through the other end, the end portion of the longer optical fiber which is to be connectorized. The splice body generally aligns the respective end portions of the optical fibers such that the optical fibers are optically interconnected. In addition, the respective end portions of the optical fibers can be fixed in position within the splice body, such as by a cam or other mechanical actuation means.

While these conventional splice housings and associated connectors optically interconnect the respective end portions of the optical fibers in an effective manner, conventional splice housings are designed such that the rear portion of the ferrule abuts and is immediately adjacent to the splice body. See, for example, the Li '613 patent, and the de Jong '867 patent. In addition, conventional splice housings and the related connectors generally include a housing or sleeve that snugly receives both the splice body and the ferrule such that the resulting assembly, including the splice body and the ferrule, moves as a unitary body. That is, conventional splice housings do not permit the ferrule to move relative to the splice body.

In certain instances, forces must be applied to the splice housing in an off-axis direction. For example, the connector as well as the optical fiber to which the connector is mounted may be pulled along a route that includes a number of turns or corners, thereby imparting a significant off-axis force to the connector. Since the ferrule and the splice body are generally arranged in an abutting relationship and are typically housed within a common sleeve or housing so as to move as a unitary body, the resulting splice housing is relatively long. As such, the off-axis forces applied to the ferrule create a relatively large moment that is coupled to the ferrule and the splice body, thereby structurally damaging or degrading the connector in some instances.

SUMMARY OF THE INVENTION

The present invention relates generally to a splice housing assembly and an associated assembly method in which the ferrule is mechanically decoupled from the splice body such that the ferrule has at least limited movement, preferably in an off-axis direction, relative to the splice body. In addition to the splice body and the ferrule, the splice housing assembly preferably includes a housing defining a lengthwise extending passageway within which both the ferrule and the splice body are at least partially disposed. The ferrule is adapted to be mounted upon the first end portion of a first optical fiber, typically a fiber optic stub. In addition, the splice body aligns the second end portion of the first optical fiber with an end portion of a second optical fiber such that the first and second optical fibers are optically interconnected. According to the present invention, the splice housing assembly includes means for mechanically decoupling the ferrule from the splice body such that the ferrule has at least limited movement relative to the splice body. In one advantageous embodiment, the means for mechanically decoupling the ferrule from the splice body is provided by spacing the ferrule in a lengthwise direction from the splice body such that a medial portion of the first optical fiber extends between the ferrule and the splice body. By mechanically decoupling the ferrule from the splice body, the ferrule has at least limited movement relative to the splice body so as to reduce, if not prevent, the relatively large moments that would otherwise be coupled to both the ferrule and the splice body upon application of off-axis forces.

According to a method aspect to the present invention, the splice housing assembly is assembled by initially extending the second end portion of the first optical fiber into the splice body. The ferrule is then mounted upon the first end portion of the first optical fiber such that the medial portion of the first optical fiber extends between the ferrule and the splice body. The ferrule and the splice body are then at least partially disposed with the lengthwise extending passageway defined by the housing such that the ferrule extends through a first end of the housing and the splice body extends through the second end of the housing. In disposing the ferrule and the splice body within the passageway defined by the housing, the ferrule and the splice body are spaced apart in a lengthwise direction within the passageway such that the ferrule is mechanically decoupled from the splice body.

Advantageously, the splice housing assembly can be assembled at the factory by mounting the splice body and the ferrule upon opposed end portions of the first optical fiber and thereafter disposing the ferrule and the splice body within the lengthwise extending passageway defined by the housing. As such, a technician need only insert an end portion of the second optical fiber into the splice body and insert the splice housing assembly into an outer housing in the field.

DETAILED DESCRIPTION OF THE PREFERRED EMBODIMENTS

The present invention will now be described more fully hereinafter with reference to the accompanying drawings, in which a preferred embodiment of the invention is shown. This invention may, however, be embodied in many different forms and should not be construed as limited to the embodiments set forth herein; rather, this embodiment is provided so that this disclosure will be thorough and complete and will fully convey the scope of the invention to those skilled in the art. Like numbers refer to like elements throughout.

Figure 4:
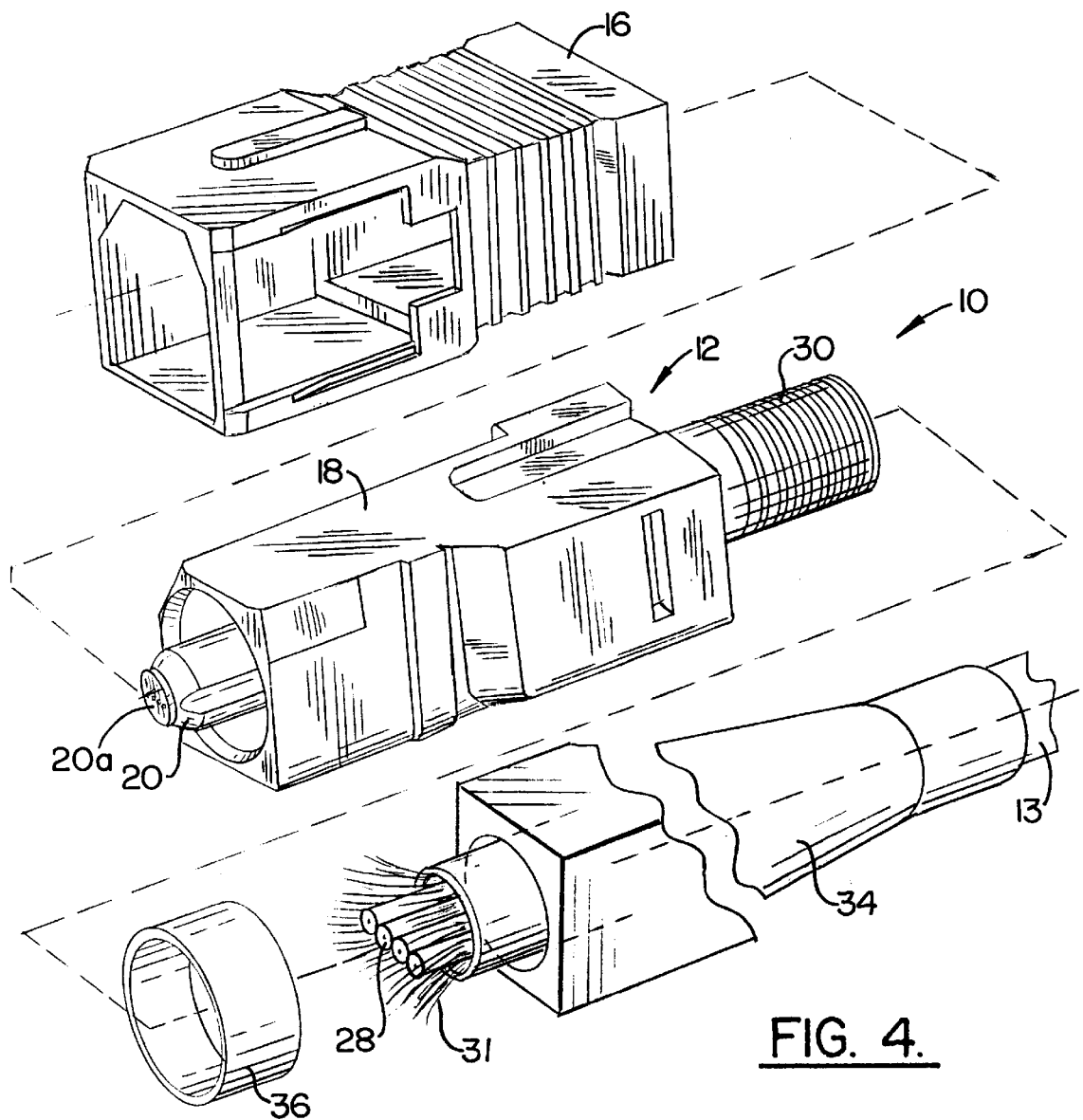
FIG. 4 is an exploded perspective view of a connector including a splice housing assembly according to one embodiment of the present invention.

Referring now to FIG. 4, an exploded perspective view of a connector 10 that includes the splice housing assembly 12 of one embodiment of the present invention is illustrated. As shown, the connector is typically mounted upon the end portion of a fiber optic cable 13 that includes one or more optical fibers.

The connector 10 generally includes an outer housing 16, typically formed of a plastic material, that defines a lengthwise extending passageway in which the splice housing assembly 12 is at least partially disposed. Although the outer housing can be shaped and sized as desired without departing from the spirit and scope of the present invention, the outer housing of one advantageous embodiment of the present invention is the outer housing which is commonly utilized in conjunction with SC, DC and QC connectors that are mounted upon the end portions of one, two and four optical fibers, respectively. Alternatively, the outer housing can be the outer housing which is commonly utilized in conjunction with an MTP connector or a mini-MTP connector that is mounted upon the end portions of a plurality of optical fibers. As known to those skilled in the art, the outer housing is typically snap-fit onto the inner housing 18 of the splice housing assembly. However, the outer housing and the inner housing can be attached in other manners without departing from the spirit and scope of the invention. Still further, the connector can include a single housing, as opposed to the outer and inner housings as illustrated in FIG. 4, without departing from the spirit and scope of the present invention.

Figure 1:
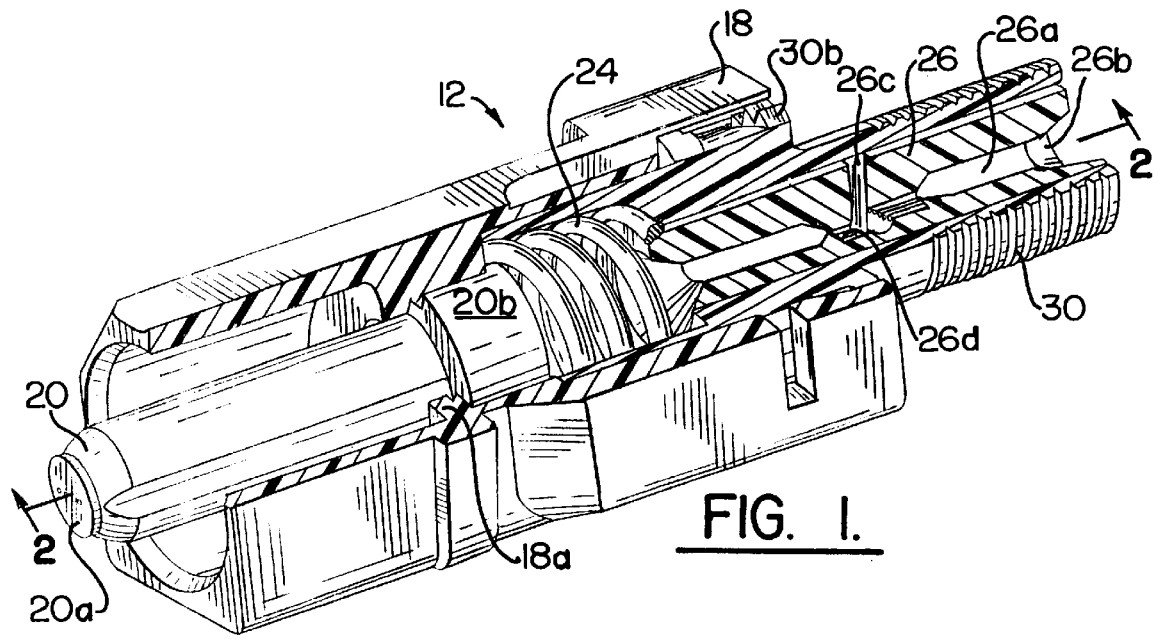
FIG. 1 is a perspective view of a splice housing assembly according to one embodiment of the present invention in which a portion of the splice housing assembly has been removed in order to illustrate internal components of the splice housing assembly.

Referring now to FIG. 1, a view of one embodiment of the splice housing assembly 12 of the present invention is provided in which a portion of the splice housing assembly is removed for purposes of illustrating the internal components of the splice housing assembly. As mentioned above, the splice housing assembly includes a housing 18, i.e., the inner housing, that is typically formed of a plastic material. Like the outer housing 16, the inner housing extends between opposed first and second ends and defines a lengthwise extending passageway.

The splice housing assembly 12 also includes a ferrule 20 that is mounted upon the end portion of a first optical fiber 22, typically by means of an adhesive or epoxy. Although the splice housing assembly can include single and multi-fiber ferrules of a variety of shapes and sizes, the connector 10 of the illustrated embodiment includes the ferrule which is utilized by a conventional QC connector that is mounted upon the end portion of four optical fibers. Typically, the ferrule is comprised of a ceramic material, such as zirconia. However, the ferrule can be formed of other materials, such as thermoplastic and thermoset materials.

Figure 2:
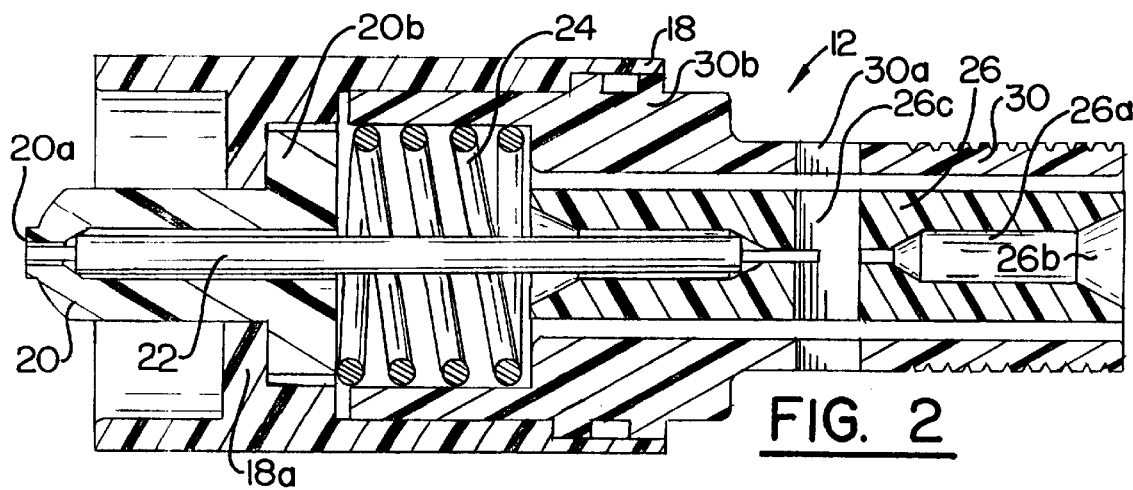
FIG. 2 is a cross-sectional view of the splice housing assembly of FIG. 1 taken along line 2—2.

As shown in FIGS. 1 and 2, the ferrule 20 is at least partially disposed within one passageway defined by the inner housing 18. In particular, the ferrule is preferably disposed within the passageway defined by the inner housing such that a leading end 20a of the ferrule is exposed through the first end of the inner housing for alignment and interconnection with the ferrule of another connector. As shown in FIGS. 1 and 2, the splice housing assembly 12 can also include a spring 24 for biasing the ferrule such that the leading end of the ferrule extends through the first end of the inner housing. However, the ferrule is retained at least partially within the passageway defined by the inner housing, such as by the engagement of a shoulder defined by the enlarged rear portion 20b of the ferrule with a flange 18a extending inwardly into the passageway defined by the inner housing.

The splice housing assembly 12 also includes a splice body 26 for optically interconnecting the first optical fiber 22 upon which the ferrule 20 is mounted with another, typically longer, optical fiber 28, hereinafter referred to as the second optical fiber. As shown in FIGS. 1 and 2, the splice body is at least partially disposed within the passageway defined by the inner housing 18 proximate the second end of the inner housing. As also shown, the splice body generally extends rearwardly beyond the second end of the inner housing.

As illustrated, the splice body 26 of one embodiment is a lengthwise extending member, typically having a cylindrical shape, that defines one or more bores 26a opening through each of the opposed ends of the splice body. As such, the end portions of the first and second optical fibers can be inserted into respective bores opening through the opposed ends of the splice body, i.e., the end portions of the first optical fibers 22 can be inserted through the bores opening through the end of the splice body, while the end portions of the second optical fibers 28 can be inserted through the bores opening through the other end of the splice body. As will be apparent, the splice body generally defines the same number of bores as the ferrule, such as four in the illustrated embodiment. As also shown, the splice body can include lead-in or funnel portions 26b opening through each of the opposed ends to facilitate the insertion of the end portions of the first and second optical fibers into the respective bores defined by the splice body.

The splice body 26 aligns the end portions of each of the first optical fibers 22 with the respective end portions of the second optical fibers 28 such that corresponding ones of the first and second optical fibers are optically interconnected. In addition to be optically aligned, the respective end portions of the first and second optical fibers can be joined, such as by fusion splicing. In the illustrated embodiment, the splice body therefore also defines a laterally extending slot 26c opening through a medial portion of the splice body. The slot defined by the splice body exposes the end portions of the first and second optical fibers which meet and are aligned within the slot. In this regard, the portion of the splice body exposed by the laterally extruding slot can define a number of grooves 26d for receiving the end portions of the first and second optical fibers and for facilitating the alignment of the end portions of corresponding ones of the first and second optical fibers. In order to join the end portions of corresponding ones of the first and second optical fibers, the respective end portions of the first and second optical fibers can be fusion spliced as described in U.S. patent application Ser. No. 08/417,312 (now U.S. Pat. No. 5,748,819) which describes, among other things, the FuseLite™ connector assembly developed by Seicor Corporation, the assignee of the present application.

Although a splice body 26 designed to permit fusion splicing of the respective end portions of the first and second optical fibers is described and illustrated, the splice body can include a number of other designs without departing from the spirit and scope of the present invention so long as the splice body aligns the respective end portions of the first and second optical fibers such that corresponding ones of the first and second optical fibers are optically interconnected. For example, the splice body can provide a mechanical splice without physically joining the respective end portions of the first and second optical fibers, if so desired. With respect to mechanical splices, the splice body can provide a non-actuated elastomeric splice or an actuated splice, such as by means of a cam or the like. In either embodiment, the splice body that provides the mechanical splice can include first and second portions that are urged together so as to secure the respective end portions of the first and second optical fibers in an aligned relationship therebetween. As known to those skilled in the art, one of the first and second portions generally includes an inner surface that defines one or more grooves for receiving and aligning respective end portions of the first and second optical fibers.

The splice housing assembly 12 can also include a crimp body 30, that is generally formed of a metallic material and that defines a lengthwise extending passageway. The crimp body is disposed at least partially within the passageway defined by the inner housing 18 and generally extends rearwardly from the second end of the inner housing. As shown in FIGS. 1 and 2, the splice body 26 is preferably disposed in a free floating manner within the lengthwise extending passageway defined by the crimp body. In the illustrated embodiment in which the splice body provides for the fusion splicing of the respective end portions of the first and second optical fibers, the crimp body can also define a slot 30a opening through a medial portion of the crimp body and aligned with the slot 26c opening through a medial portion of the splice body to facilitate fusion splicing of the respective end portions of the first and second optical fibers.

The lengthwise extending passageway defined by the crimp body 30 is preferably enlarged at one end for housing the spring 24 which biases the ferrule outwardly through the first end of the inner housing 18. Although the crimp body can be attached to the inner housing in a variety of manners without departing from the spirit and scope of the present invention, the crimp body of one advantageous embodiment includes a number of outwardly extending projections 30b which contact the inner surface of the inner housing and which can be ultrasonically welded thereto. In order to provide strain relief for the second optical fiber 28 as described below, the strength members 31 associated with the second optical fiber, such as the KEVLAR™ yarn which typically surrounds an optical fiber, can be crimped between the crimp body and a crimp band 36 that encircles a rear portion of the crimp body.

According to the present invention, the splice housing assembly 12 includes means for mechanically decoupling the ferrule 20 from the splice body 26 such that the ferrule has at least limited movement relative to the splice body. In the embodiment in which the inner housing 18 defines a lengthwise extending axis, the means for mechanically decoupling the ferrule from the splice body preferably permits at least limited off-axis movement of the ferrule relative to the splice body. The means for mechanically decoupling the splice body is preferably provided by the splice housing assembly of the present invention by spacing the ferrule apart from the splice body apart in a lengthwise direction within the passageway defined by the inner housing. As shown in FIGS. 1 and 2, a medial portion of the first optical fiber 22, i.e., the optical fiber stub, extends between the splice body and the ferrule. Preferably, the medial portion of the first optical fiber that extends between the spaced apart splice body and the ferrule includes a buffer jacket.

By mechanically decoupling the ferrule 20 from the splice body 26 so as to permit at least limited movement of the ferrule relative to the splice body and, more preferably, at least limited off-axis movement of the ferrule relative to the splice body, off-axis forces can be applied to the ferrule without creating a relatively large moment or torque that is coupled to both the ferrule and the splice body. Thus, the splice housing assembly 12 of the present invention permits more flexibility in pulling a connectorized optical fiber along a route which twists and turns. In addition, the splice housing assembly of the present invention permits more flexibility in mating a connectorized fiber optic cable with another connectorized fiber optic cable in which the ferrules may have to shift somewhat in order to properly align.

Figure 3A:
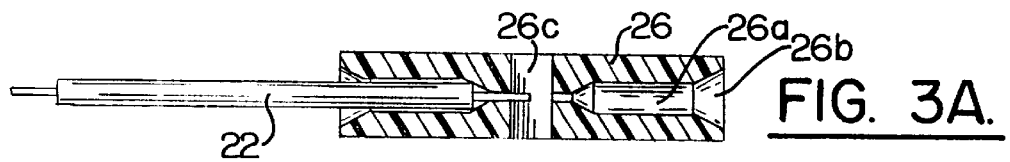
FIG. 3A–3C are cross-sectional views of portions of the splice housing assembly illustrating the operations performed to assemble the splice housing assembly according to one embodiment of the present invention.
Figure 3B:
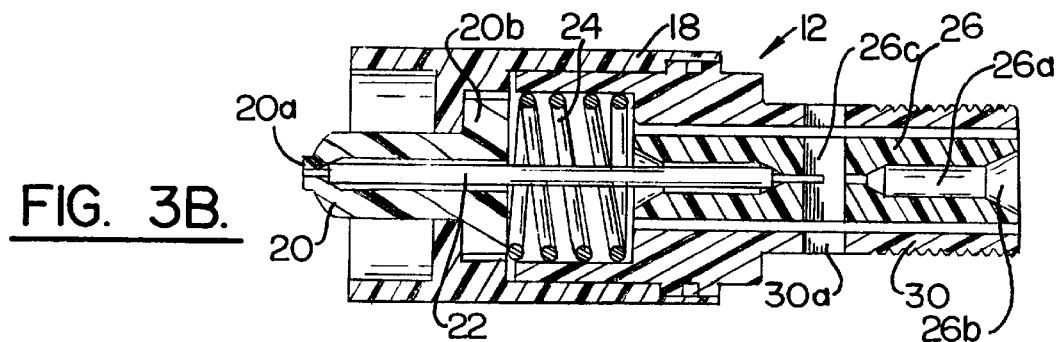

In order to assemble the splice housing assembly 12, the opposed end portions of the first optical fiber 22, typically an optical fiber stub, are stripped and cleaved. The second end portion of the first optical fiber can then be inserted through a respective bore 26a opening through one end of the splice body 26 as shown in FIG. 3A. Thereafter, the ferrule 20 can be mounted upon the first end portion of the first optical fiber and can be secured thereto, such as by means of an adhesive or epoxy. After assembling the spring 24, the crimp body 30 and the inner housing 18 about the ferrule and the splice body, the first end portion of the first optical fiber that is exposed through the leading end 20a of the ferrule can be polished to produce the splice housing assembly shown in FIG. 3B. According to one advantageous embodiment, splice housing assemblies as shown in FIG. 3B can be mass produced in a factory setting. Thereafter, the splice housing assembly of FIG. 3B can be shipped, along with an outer housing 16, a boot 34, and a crimp band 36, for installation in the field.

Figure 3C:
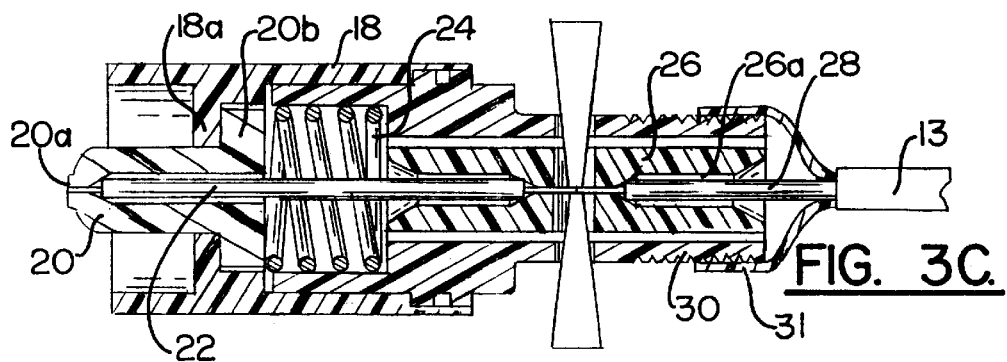

In order to mount the splice housing assembly 12 upon the end portion of the second optical fiber 28, the end portion of the second optical fiber is typically prepared, such as by stripping the buffer jacket and cleaving the end portion of the second optical fiber. The end portion of the second optical fiber is then inserted through a respective bore 26a opening through the opposite end of the splice body 26 such that the end portions of the first and second optical fibers are optically aligned by the splice body. In the illustrated embodiment, the end portions of the first and second optical fibers can then be fusion spliced as shown in FIG. 3C.

In order to provide strain relief for the second optical fiber 28, the strength members 31 associated with the second optical fiber, such as the KEVLAR™ yarn surrounding the second optical fiber, can be crimped between the crimp band 36 and the crimp body 30. Typically, the crimp body and the crimp band are comprised of a metal, such as brass. The outer housing 16 can then be attached to the inner housing 18, such as in a snap-fit relationship, and the boot 34 can be advanced over and frictionally engaged by the crimp band and the rearwardly extending portion of the crimp body to form the resulting connector. By having assembled the splice housing assembly 12 of FIG. 3B in the factory, the remaining steps including those illustrated in FIG. 3C that are performed in the field are minimized, thereby facilitating connectorization of the second optical fiber.

In the drawings and the specification, there has been set forth a preferred embodiment of the invention and, although specific terms are employed, the terms are used in a generic and descriptive sense only and not for purpose of limitation, the scope of the invention being set forth in the following claims.

That which is claimed is:

1. A splice housing assembly comprising:

a housing defining a lengthwise extending passageway;

a ferrule adapted to be mounted upon a first end portion of a first optical fiber, said ferrule disposed within the passageway defined by said housing;

a splice body, at least partially disposed within the passageway defined by said housing, for aligning a second end portion of the first optical fiber, opposite the first end portion, with an end portion of a second optical fiber such that the first and second optical fibers are optically interconnected; and means for mechanically decoupling said ferrule from said splice body such that said ferrule has at least limited movement relative to said splice body.

2. A splice housing assembly according to claim 1 wherein said ferrule and said splice body are spaced apart in a lengthwise direction within the passageway defined by said housing such that a medial portion of the first optical fiber extends therebetween to thereby mechanically decouple said ferrule from said splice body.

3. A splice housing assembly according to claim 1 wherein said housing defines a lengthwise extending axis, and wherein said means for mechanically decoupling said ferrule from said splice body permits at least limited off-axis movement of said ferrule relative to said splice body.

4. A splice housing assembly according to claim 1 further comprising a spring disposed within the passageway defined by said housing for biasing said ferrule in a direction extending away from said splice body.

5. A splice housing assembly according to claim 1 further comprising:

an outer housing at least partially surrounding said housing; and a crimp body attached to said housing and at least partially surrounding said splice body.

6. A splice housing assembly comprising:

a housing defining a lengthwise extending passageway;

first and second optical fibers, each optical fiber extending between opposed first and second end portions;

a ferrule mounted upon the first end portion of said first optical fiber, said ferrule disposed within the passageway defined by said housing; and a splice body, at least partially disposed within the passageway defined by said housing, for aligning the second end portion of said first optical fiber with the first end portion of said second optical fiber such that said first and second optical fibers are optically interconnected;

wherein said ferrule and said splice body are spaced apart in a lengthwise direction within the passageway defined by said housing such that a medial portion of said first optical fiber extends between said ferrule and said splice body, thereby mechanically decoupling said ferrule from said splice body such that said ferrule has at least limited movement relative to said splice body.

7. A splice housing assembly according to claim 6 wherein said housing defines a lengthwise extending axis, and wherein said means for mechanically decoupling said ferrule from said splice body permits at least limited off-axis movement of said ferrule relative to said splice body.

8. A splice housing assembly according to claim 6 wherein the medial portion of said first optical fiber that extends between said ferrule and said splice body includes a buffer jacket.

9. A splice housing assembly according to claim 6 further comprising a spring disposed within the passageway defined by said housing for biasing said ferrule in a direction extending away from said splice body.

10. A splice housing assembly according to claim 6 further comprising:

an outer housing at least partially surrounding said housing; and a crimp body attached to said housing and at least partially surrounding said splice body.

11. A method for assembling a splice housing assembly so as to optically interconnect first and second optical fibers, the method comprising the steps of:

extending a second end portion of the first optical fiber into a splice body;

mounting a ferrule upon a first end portion of the first optical fiber such that a medial portion of the first optical fiber extends between the ferrule and the splice body; and disposing the ferrule and the splice body at least partially within a lengthwise extending passageway defined by a housing such that the ferrule extends through a first end of the housing and the splice body extends through a second end of the housing, said disposing step comprising spacing the ferrule and the splice body apart in a lengthwise direction within the passageway defined by the housing such that the ferrule is mechanically decoupled from the splice body, thereby providing the ferrule with at least limited movement relative to the splice body.

12. A method according to claim 11 further comprising the step of inserting an end portion of the second optical fiber into the splice body such that the respective end portions of the first and second optical fibers are optically interconnected.

13. A method according to claim 12 further comprising the step of disposing the housing at least partially within an outer housing following said inserting step.

14. A method according to claim 13 wherein the steps of inserting the end portion of the second optical fiber into the splice body and disposing the housing at least partially within the outer housing are performed in the field.

15. A method according to claim 12 further comprising the step of fusion splicing the respective end portions of the first and second optical fibers within the splice body.

16. A method according to claim 11 wherein said extending, mounting and disposing steps are performed in the factory prior to shipment to the field.

* * * * *